United States Patent
Chen et al.

(10) Patent No.: US 12,518,776 B2
(45) Date of Patent: Jan. 6, 2026

(54) METHOD AND SYSTEM FOR MULTIMODAL EMOTION RECOGNITION IN CONVERSATION (ERC) BASED ON GRAPH NEURAL NETWORK (GNN)

(71) Applicant: Sichuan Artificial Intelligence Research Institute (Yibin), Yibin (CN)

(72) Inventors: Feiyu Chen, Yibin (CN); Jie Shao, Yibin (CN); Shuyuan Zhu, Yibin (CN); Hengtao Shen, Yibin (CN)

(73) Assignee: Sichuan Artificial Intelligence Research Institute (Yibin), Yibin (CN)

( * ) Notice: Subject to any disclaimer, the term of this patent is extended or adjusted under 35 U.S.C. 154(b) by 245 days.

(21) Appl. No.: 18/220,303

(22) Filed: Jul. 11, 2023

(65) Prior Publication Data
US 2024/0355350 A1    Oct. 24, 2024

(30) Foreign Application Priority Data
Apr. 21, 2023    (CN) .......................... 202310437725.6

(51) Int. Cl.
*G10L 15/00*    (2013.01)
*G10L 17/02*    (2013.01)
(Continued)

(52) U.S. Cl.
CPC .............. *G10L 25/63* (2013.01); *G10L 17/02* (2013.01); *G10L 17/18* (2013.01); *G10L 25/06* (2013.01)

(58) Field of Classification Search
None
See application file for complete search history.

(56) References Cited

U.S. PATENT DOCUMENTS 9,093,081 B2 *    7/2015    Laperdon ................. G10L 25/63
10,896,688 B2 *   1/2021    Vaculin ....................... G06N 5/00
(Continued)

FOREIGN PATENT DOCUMENTS

| CN | 105593851 A | 5/2016 |
| CN | 111164601 A | 5/2020 |

(Continued)

OTHER PUBLICATIONS

Yahui Fu, A Study on Context-independent and Context-dependent Emotion Recognition, 2022, pp. 1-59.
(Continued)

*Primary Examiner* — Satwant K Singh
(74) *Attorney, Agent, or Firm* — Bayramoglu Law Offices LLC (57) ABSTRACT

A method and a system for multimodal emotion recognition in conversation (ERC) based on a graph neural network (GNN) are provided. The method includes: S1: acquiring a single-modal representation perceived by a speaker and a context of a conversation; S2: extracting cross-modal and cross-context multivariate and high-order information based on the single-modal representation perceived by the speaker and the context to acquire multivariate representation data; S3: extracting different importance of different cross-modal and cross-context frequency components to acquire multi-frequency representation data; S4: fusing the multivariate representation data and the multi-frequency representation data to acquire an emotional representation of each utterance in an input conversation; and S5: acquiring a prediction label for each utterance in the input conversation based on the emotional representation, and outputting the prediction label as a multimodal ERC result. The method can improve the accuracy and efficiency of ERC.

18 Claims, 4 Drawing Sheets

(51) Int. Cl.
*G10L 17/18* (2013.01)
*G10L 25/06* (2013.01)
*G10L 25/63* (2013.01)

(56) References Cited

U.S. PATENT DOCUMENTS

| | | | | |
|---|---|---|---|---|
| 11,238,289 | B1* | 2/2022 | Tao | G06N 3/08 |
| 2011/0196677 | A1* | 8/2011 | Deshmukh | G10L 15/22 |
| | | | | 704/E15.001 |
| 2014/0095109 | A1* | 4/2014 | Ashbrook | G06Q 30/02 |
| | | | | 702/179 |
| 2022/0148573 | A1* | 5/2022 | Aher | G10L 15/08 |
| 2022/0270636 | A1* | 8/2022 | Tao | G06F 40/284 |
| 2023/0186151 | A1* | 6/2023 | Selim | G06N 20/00 |
| | | | | 706/12 |
| 2024/0203445 | A1* | 6/2024 | Onando | G10L 25/63 |

FOREIGN PATENT DOCUMENTS

| | | |
|---|---|---|
| CN | 114118165 A | 3/2022 |
| CN | 115659242 A | 1/2023 |
| CN | 115795020 A | 3/2023 |

OTHER PUBLICATIONS

Feiyu Chen, et al., Modeling Hierarchical Uncertainty for Multimodal Emotion Recognition in Conversation, IEEE Transactions on Cybernetics, 2024, pp. 187-198, vol. 54, No. 1.

* cited by examiner

METHOD AND SYSTEM FOR MULTIMODAL EMOTION RECOGNITION IN CONVERSATION (ERC) BASED ON GRAPH NEURAL NETWORK (GNN)

CROSS REFERENCE TO THE RELATED APPLICATIONS

This application is based upon and claims priority to Chinese Patent Application No. 202310437725.6, filed on Apr. 21, 2023, the entire contents of which are incorporated herein by reference.

TECHNICAL FIELD

The present disclosure relates to the technical field of affective computing, and in particular to a method and a system for multimodal emotion recognition in conversation (ERC) based on a graph neural network (GNN).

BACKGROUND

The emotion recognition in conversation (ERC) task aims to enable a machine to detect human emotions interacting in a conversation based on multimodal data (i.e. textual, visual, and auditory). Unlike traditional affective computing tasks performed in a single-modal (i.e. textual, visual, or auditory modality) or non-conversational scene, the ERC task faces a unique and critical challenge, that is, to explore a cross-modal and cross-context multivariate relationship.

Researchers have been exploring how to more effectively capture the complex relationship. The existing ERC model mainly captures the contextual relationship through a context-aware module (such as a recurrent unit or Transformer), and models the multimodal relationship through various fusion methods. Although this approach has made some progress, it often underestimates the cross-modal and cross-context multivariate relationship. It encodes the multimodal and cross-context relationship in a loosely coupled manner, limiting the natural interactions in it, resulting in insufficient learning of the relationship.

Recently, the graph neural network (GNN) has shown certain advantages in capturing data relationships, providing new solutions for the ERC task. A common solution is to build a heterogeneous graph. In the heterogeneous graph, each modality of the utterance is considered as a node and connected to other modalities of the same utterance and utterances of the same modality in the same conversation. This usually follows a carefully adjusted edge weighting strategy. On this basis, multimodal and contextual dependencies between utterances can be modeled simultaneously through message propagation, providing closer entanglement and richer interaction. Although these GNN-based methods are powerful, they have two limitations as follows:

i) The modeling of the multivariate relationship is inadequate. The traditional GNN-based methods assume that objects of interest have pairwise relationships and approximations of high-order and multivariate relationships can only be provided through multiple pairwise combinations. However, reducing these multivariate relationships to pairwise combinations may impair the expression ability. Therefore, the existing GNN-based methods are unable to fully model the complex multivariate relationship in ERC.

ii) The high-frequency messages are underestimated. Research has shown that the propagation rules of the GNN (i.e. aggregation and smoothing of messages from neighboring nodes) are similar to fixed low-pass filters, and the main flow in the graph is the low-frequency messages, while the effect of the high-frequency messages is significantly reduced. In addition, research has shown that the low-frequency message can preserve the commonality of node features and perform better in the homogeneous graph (where connected nodes often have similar features and share the same labels). In contrast, the high-frequency messages that reflect differences and inconsistencies are more important in the heterogeneous graph. For ERC, the constructed graph typically exhibits high heterogeneity, where there may be inconsistent emotional information between modalities or short-distance contexts. However, the existing GNN-based ERC models seriously overlook the fact that the high-frequency message may provide critical guidance, resulting in a bottleneck in performance improvement.

SUMMARY

An objective of the present disclosure is to provide a method and a system for multimodal emotion recognition in conversation (ERC) based on a graph neural network (GNN). The present disclosure investigates a cross-modal and cross-context multivariate relationship, and fully utilizes messages of different frequencies that reflect emotional differences and emotional commonalities, improving the accuracy and efficiency of ERC.

In order to resolve the above technical problem, the present disclosure adopts the following technical solutions:

The present disclosure provides a method for multimodal ERC based on a GNN, including:

S1: acquiring a single-modal representation perceived by a speaker and a context of a conversation, where the single-modal representation includes textual, visual, and auditory single-modal representations;

S2: extracting cross-modal and cross-context multivariate and high-order information based on the single-modal representation perceived by the speaker and the context to acquire multivariate representation data;

S3: extracting different importance of different cross-modal and cross-context frequency components to acquire multi-frequency representation data;

S4: fusing the multivariate representation data and the multi-frequency representation data to acquire an emotional representation of each utterance in an input conversation; and S5: acquiring a prediction label for each utterance in the input conversation based on the emotional representation, and outputting the prediction label as a multimodal ERC result.

Optionally, step S1 includes:

S11: encoding, by a bidirectional gated recurrent unit (GRU), a textual feature of the input conversation to acquire textually encoded data;

S12: encoding, by a first fully connected network and a second fully connected network, auditory and visual features of the input conversation, respectively, to acquire visually encoded data and auditorily encoded data;

S13: calculating an embedding representation of the speaker; and

S14: acquiring the textual, visual, and auditory single-modal representations respectively based on the textually encoded data, the visually encoded data, the auditorily encoded data, and the embedding representation.

Optionally, step S11 includes:

$$c_i^t = \overleftrightarrow{GRU}(u_i^t, c_{i(+,-)1}^t)$$

step S12 includes:

$$c_i^a = W_1 u_i^a + b_i^a$$
$$c_i^v = W_2 u_i^v + b_i^v$$

where $c_i^t$ denotes the textually encoded data; $c_i^a$ denotes the auditorily encoded data; $c_i^v$ denotes the visually encoded data; $\overleftrightarrow{GRU}(\ )$ denotes a function of the bidirectional GRU; $u_i^t$ denotes the textual feature of an i-th utterance in the input conversation; $c_{i(+,-)1}^t$ indicates $c_{i+1}^t$ or $c_{i-1}^t$, denoting a preceding text or a subsequent text of a text input into the bidirectional GRU $\overleftrightarrow{GRU}(\ )$; $W_1$ denotes the first fully connected network; $u_i^a$ denotes the auditory feature of the i-th utterance in the input conversation; $b_i^a$ denotes an auditory bias; $W_2$ denotes the second fully connected network; $u_i^v$ denotes the visual feature of the i-th utterance in the input conversation; and $b_i^v$ denotes a visual bias;

step S13 includes:

$$S_i = W_s s_i$$

where $S_i$ denotes an embedding feature of the speaker in an i-th round of conversation; $W_s$ denotes a trainable weight; and $S_i$ denotes a one-hot vector, referring to each speaker;

step S14 includes:

$$h_i^x = c_i^x + S_i, x \in \{t, a, v\}$$

where $h_i^x$ denotes a single-modal representation perceived by the speaker and the context of the i-th round of conversation; when x=t, $c_i^x$ denotes the textually encoded data; when x=a, $c_i^x$ denotes the auditorily encoded data; and when x=v, $c_i^x$ denotes the visually encoded data, and $S_i$ denotes the embedding representation of the speaker.

Optionally, step S2 includes:

S21: determining multiple first nodes based on the single-modal representation perceived by the speaker and the context;

S22: constructing a multimodal hyper-edge and a contextual hyper-edge for each of the first nodes;

S23: assigning a weight to each node connected to each of the multimodal hyper-edge and the contextual hyper-edge and a weight to each of the multimodal hyper-edge and the contextual hyper-edge;

S24: generating a hyper-graph based on each of the first nodes, each of the multimodal hyper-edge and the contextual hyper-edge, the weight assigned to each node connected to each of the multimodal hyper-edge and the contextual hyper-edge, and the weight assigned to each of the multimodal hyper-edge and the contextual hyper-edge;

S25: performing a first node convolution on the hyper-graph, updating hyper-edge embedding by aggregating a node feature, and performing a hyper-edge convolution to propagate a hyper-edge message to the first node; and S26: repeating step S25 until a last iteration, and taking an output of the last iteration as the multivariate representation data.

Optionally, step S25 includes:

$$V^{(l+1)} = \sigma\left(D_H^{-1} H W_e B^{-1} \hat{H}^T V^{(l)}\right)$$

where $V^{(l)}$ denotes an input into an l-th layer of a hyper-graph neural network, $$V^{(l)} = \{v_{i,(l)}^x \mid i \in [1, N], x \in \{t, a, v\}\} \in \mathbb{R}^{|v_H| \times D_h};$$

$v_{i,(l)}^x$ denotes a node in the l-th layer of the hyper-graph neural network; $v_H$ denotes a set of nodes in the hyper-graph; $D_h$ denotes a feature dimension of nodes in a hidden layer in the hyper-graph neural network; $\sigma(\ )$ denotes a nonlinear activation function; $W_e$ denotes a hyper-edge weight matrix, $$W_e = \text{diag}(w(e_1), \ldots, w(e_{|\varepsilon_H|}));$$

diag( ) denotes a diagonal matrix; w( ) (denotes the weight; $e_1$ denotes a first hyper-edge; $e_{|\varepsilon_H|}$ denotes the hyper-edge $|\varepsilon_H|$; $\varepsilon_H$ denotes a set of hyper-edges in the hyper-graph; $D_H \in \mathbb{R}^{|v_H| \times |v_H|}$ and $B \in \mathbb{R}^{|\varepsilon_H| \times |\varepsilon_H|}$ denote a node degree matrix and a hyper-edge degree matrix, respectively; H denotes a hyper-graph node and edge connection incidence matrix, $H \in \mathbb{R}^{|v_H| \times |\varepsilon_H|}$; $\hat{H}$ denotes a weighted incidence matrix, $$\hat{H} = \begin{cases} \gamma_e(v), & \text{if the hyper-edge } e \text{ is connected to the node } v; \\ 0, & \text{others} \end{cases};$$

and T denotes a transpose operation.

Optionally, step S3 includes:

S31: determining multiple second nodes based on the single-modal representation perceived by the speaker and the context;

S32: constructing an undirected graph based on all the second nodes;

S33: extracting, by a high-pass filter and a low-pass filter, a high-frequency message and a low-frequency message of a feature of a current node in the undirected graph, respectively;

S34: combining the high-frequency message and the low-frequency message through a weighted sum;

S35: considering a correlation between the current node and a neighboring node based on contributions of a high-frequency signal and the low-frequency message of the neighboring node to a weight of the current node, determining dominant information of the current node, and determining whether to receive differential information between the current node and the neighboring node;

S36: propagating the dominant information and the differential information to the entire undirected graph, and stacking K layers, such that each of the second nodes receives a multi-frequency signal from a K-hop neighboring node; and S37: taking an output of a last layer as the multi-frequency representation data.

Optionally, in step S32, an adjacency matrix of the undirected graph is expressed as: $A \in \mathbb{R}^{|v_g| \times |v_g|}$;

a normalized graph Laplacian matrix of the undirected graph is expressed as: $L = I - D_g^{-1/2} A D_g^{-1/2}$; $D_g$ denotes a diagonal degree matrix; I denotes an identity matrix; A denotes the adjacency matrix of the undirected graph; and $v_g$ denotes a node set in the graph;

step S34 includes:

$$F^{(k+1)} = R^l(F_l \cdot F^{(k)}) + R^h(F_h \cdot F^{(k)}) = F^{(k)} + (R^l - R^h)D_g^{-1/2}AD_g^{-1/2}F^{(k)}$$

where $F^{(k)}$ denotes an input into a k-th layer, $$F^{(k)} = \{f_{i,(k)}^x \mid i \in [1, N], x \in \{t, a, v\}\} \in \mathbb{R}^{|v_g| \times D_h};$$

$R^l, R^h \in \mathbb{R}^{|v_g| \times |v_g|}$ matrices of the low-frequency message and the high-frequency message, respectively; and the above equation is rewritten as:

$$f_{i,(k+1)} = f_{i,(k)} + \sum_{j \in N_i} \frac{r_{ij}^l - r_{ij}^h}{\sqrt{|N_j|}\sqrt{|N_i|}} f_{i,(k)}$$

where $N_i$ denotes a neighboring node of a node i; $N_j$ denotes a neighboring node of a node j; and $r_{ij}^l$ and $r_{ij}^h$ denote contributions of a low-frequency message and a high-frequency message of the node j to the node i, respectively, where $r_{ij}^l + r_{ij}^h = 1$.

Optionally, step S4 includes:

$$e_i = \vec{v}_i^t \oplus \vec{f}_i^t \oplus \vec{v}_i^a \oplus \vec{f}_i^a \oplus \vec{v}_i^v \oplus \vec{f}_i^v$$

step S5 includes:

$\hat{y}_l = \arg \max_\tau(P_i[\tau])$ where $\hat{y}_l$ denotes the prediction label of the input conversation; $P_i$=soft max $(W_4 \tilde{e}_i + b_4)$; $W_4$ denotes a trainable weight matrix; $\tilde{e}_i$ denotes a normalized emotional representation, $\tilde{e}_i$=ReLU($e_i$); $e_i$ denotes an emotional feature of the i-th utterance in the input conversation; $P_i[\tau]$ denotes a probability value of a τ-th category; τ denotes the τ-th category; $b_4$ denotes a bias of the trainable weight matrix; $v_i^x$, $i \in [1, N]$, $x \in \{t, a, v\}$ denotes the multivariate representation data; and $f_i^x$, $i \in [1, N]$, $x \in \{t, a, v\}$ denotes the multi-frequency representation data.

Optionally, a loss function L of the multimodal ERC method based on the GNN is expressed as follows:

$$L = -\frac{1}{\sum_{s=1}^{Num} c(s)} \sum_{i=1}^{Num} \sum_{j=1}^{c(i)} \log p_{ij}[y_{i,j}] + \lambda \|\theta\|_2$$

where Num denotes a number of conversations; c(i) denotes a number of utterances in a conversation i; $p_{ij}$ and $y_{i,j}$ denote a probability distribution of a prediction label and a real label for an utterance j in the conversation i, respectively; λ denotes a weight of $L_2$ regularization; θ denotes all trainable model parameters; and c(s) denotes a number of utterances in a conversation s.

The present disclosure further provides a system for multimodal ERC based on a GNN, based on the method for multimodal ERC based on a GNN, and including the following modules:

a modality encoding module, configured to acquire a single-modal representation perceived by a speaker and a context of a conversation;

a multivariate propagation module, configured to extract cross-modal and cross-context multivariate and high-order information based on the single-modal representation perceived by the speaker and the context to acquire multivariate representation data;

a multi-frequency propagation module, configured to extract different importance of different cross-modal and cross-context frequency components to acquire multi-frequency representation data; and an emotional classification module, configured to fuse the multivariate representation data and the multi-frequency representation data to acquire an emotional representation of each utterance in an input conversation, acquire a prediction label for each utterance in the input conversation based on the emotional representation, and output the prediction label as a multimodal ERC result.

The present disclosure has the following beneficial effects:

1) The present disclosure investigates a cross-modal and cross-context multivariate relationship, and fully utilizes messages of different frequencies that reflect emotional differences and emotional commonalities, improving the accuracy and efficiency of ERC.

2) The present disclosure allows the hyper-edge in the hyper-graph to connect any number of nodes so as to naturally encode the multivariate relationship. Meanwhile, the present disclosure extracts different frequency components from the node feature through a set of frequency filters and models the multi-frequency message in the undirected graph. Therefore, the present disclosure can adaptively integrate signals of different frequencies so as to capture the different importance of emotional differences and emotional commonalities in a local neighborhood, thereby achieving an adaptive information sharing model.

DETAILED DESCRIPTION OF THE EMBODIMENTS

The principles and features of the present disclosure are described below with reference to the accompanying drawings. The listed embodiments are only used to explain the present disclosure, rather than to limit the scope of the present disclosure.

Figure 1:
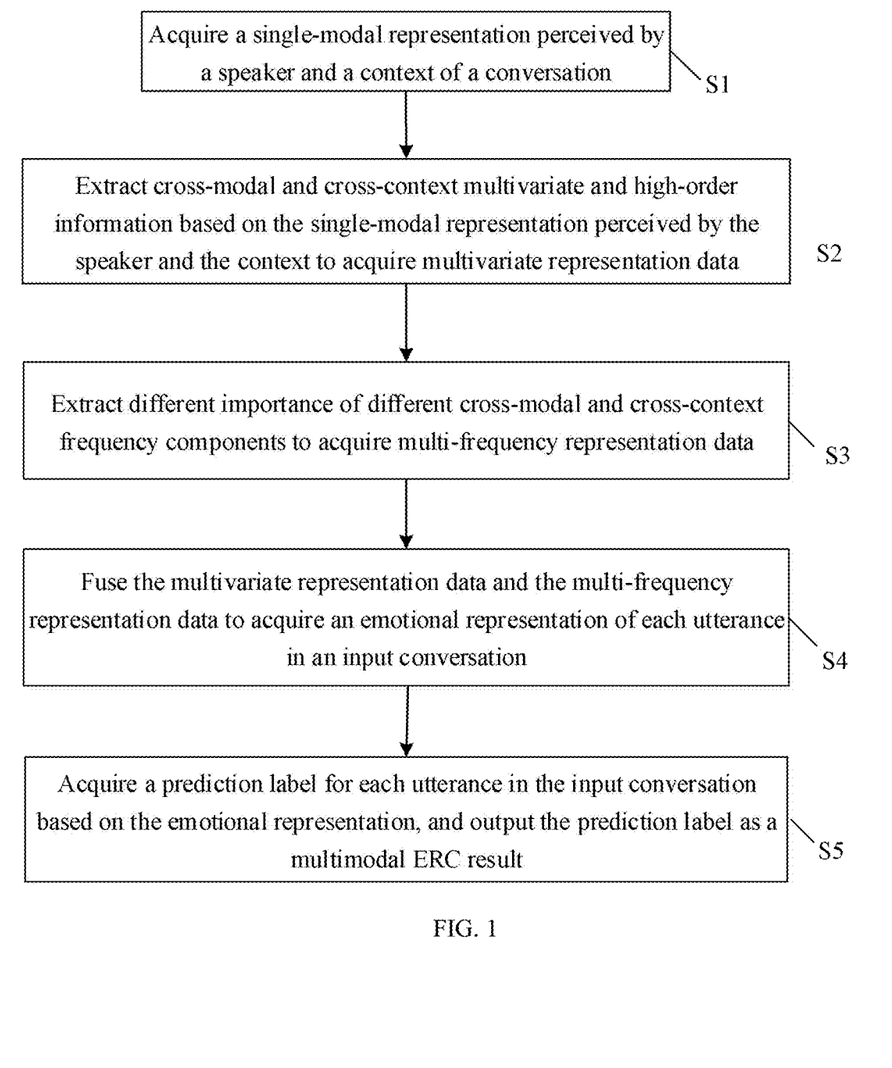
FIG. 1 is a flowchart of method for multimodal emotion recognition in conversation (ERC) based on a graph neural network (GNN) according to the present disclosure.

The present disclosure provides a method for multimodal ERC based on a GNN. As shown in FIG. 1, the method includes:

S1. A single-modal representation perceived by a speaker and a context of a conversation is acquired, where the single-modal representation includes textual, visual, and auditory single-modal representations.

A conversation includes N utterances $\{(u_1, p_1), (u_2, p_2), \ldots, (u_N, p_N)\}$. Each utterance $u_i$ is spoken by speaker $p_i$, and includes multimodal data, namely textual data $u_i^t$, visual data $u_i^v$, and auditory data $u_i^a$.

The conversation is essentially in a sequential relationship that involves multiple speakers. Therefore, the present disclosure first processes the single-modal utterance based on the speaker and the context, so as to acquire the single-modal representation perceived by the speaker and the context.

This step specifically includes the following sub-steps.

S11. A textual feature of the input conversation is encoded by a bidirectional gated recurrent unit (GRU) to acquire textually encoded data.

S12. Auditory and visual features of the input conversation are encoded by a first fully connected network and a second fully connected network, respectively, to acquire visually encoded data and auditorily encoded data.

Step S11 includes:

$$c_i^t = \overleftrightarrow{GRU}(u_i^t, c_{i(+,-)1}^t).$$

Step S12 includes:

$$c_i^a = W_1 u_i^a + b_i^a;$$
$$c_i^v = W_2 u_i^v + b_i^v.$$

$c_i^t$ denotes the textually encoded data; $c_i^a$ denotes the auditorily encoded data; $c_i^v$ denotes the visually encoded data; $\overleftrightarrow{GRU}(\ )$ denotes a function of the bidirectional GRU; $u_i^t$ denotes the textual feature of an i-th utterance in the input conversation; $c_{i(+,-)1}^t$ indicates $c_{i+1}^t$ or $c_{i-1}^t$, denoting a preceding text or a subsequent text of a text input into the bidirectional GRU $\overleftrightarrow{GRU}(\ )$; $W_1$ denotes the first fully connected network; $u_i^a$ denotes the auditory feature of the i-th utterance in the input conversation; $b_i^a$ denotes an auditory bias; $W_2$ denotes the second fully connected network; $u_i^v$ denotes the visual feature of the i-th utterance in the input conversation; and $b_i^v$, denotes a visual bias.

S13. An embedding representation of the speaker is calculated.

$$S_i = W_s s_i$$

$S_i$ denotes an embedding feature of the speaker in an i-th round of conversation; $W_s$ denotes a trainable weight; and $s_i$ denotes a one-hot vector, referring to each speaker.

S14. Based on the textually encoded data, the visually encoded data, the auditorily encoded data, and the embedding representation, the textual, visual, and auditory single-modal representations are acquired respectively.

$$h_i^x = c_i^x + S_i, x \in \{t, a, v\}$$

$h_i^x$ denotes a single-modal representation perceived by the speaker and the context of the i-th round of conversation; when x=t, $c_i^x$ denotes the textually encoded data; when x=a, $c_i^x$ denotes the auditorily encoded data; and when x=v, $c_i^x$ denotes the visually encoded data, and $S_i$ denotes the embedding representation of the speaker.

S2. cross-modal and cross-context multivariate and high-order information is extracted based on the single-modal representation perceived by the speaker and the context to acquire multivariate representation data.

A main idea of this step is to explore the cross-modal and cross-context multivariate and high-order information. In the present disclosure, hyper-graph H is first constructed from the sequentially encoded utterances. Overall, the hyper-graph $H=(V_H, \varepsilon_H, \omega, \gamma)$ is constructed based on a sequence of utterances including N rounds of conversations. Each first node $v \in V_H (|V_H|=3N)$ corresponds to a single-modal utterance, and each hyper-edge $e \in \varepsilon_H (|\varepsilon_H|=3+N)$ encodes a multimodal or contextual dependency. A weight $\omega(e)$ is assigned to each hyper-edge $e \in \varepsilon_H$, and a weight $\gamma_e(v)$ is assigned to each node v connected to each hyper-edge e. $H \in \mathbb{R}^{|V_H| \times |\varepsilon_H|}$ denotes an incidence matrix, where non-zero entry $H_{ve}=1$ indicates that the node v is connected to the hyper-edge e. Otherwise, $H_{ve}=0$.

Based on this, Step S2 includes:

S21. Multiple first nodes are determined based on the single-modal representation perceived by the speaker and the context.

Each modality of each utterance indicates a node in the hyper-graph. $v_i^t$ denotes a textual modality, $v_i^a$ denotes an auditory modality, and $v_i^v$ denotes a visual modality. Node embedding $\{v_i^t, v_i^a, v_i^v\}$ is initialized through sequentially encoded representation $\{h_i^t, h_i^a, h_i^v\}$.

S22. A multimodal hyper-edge and a contextual hyper-edge are constructed for each of the first nodes.

Figure 2:
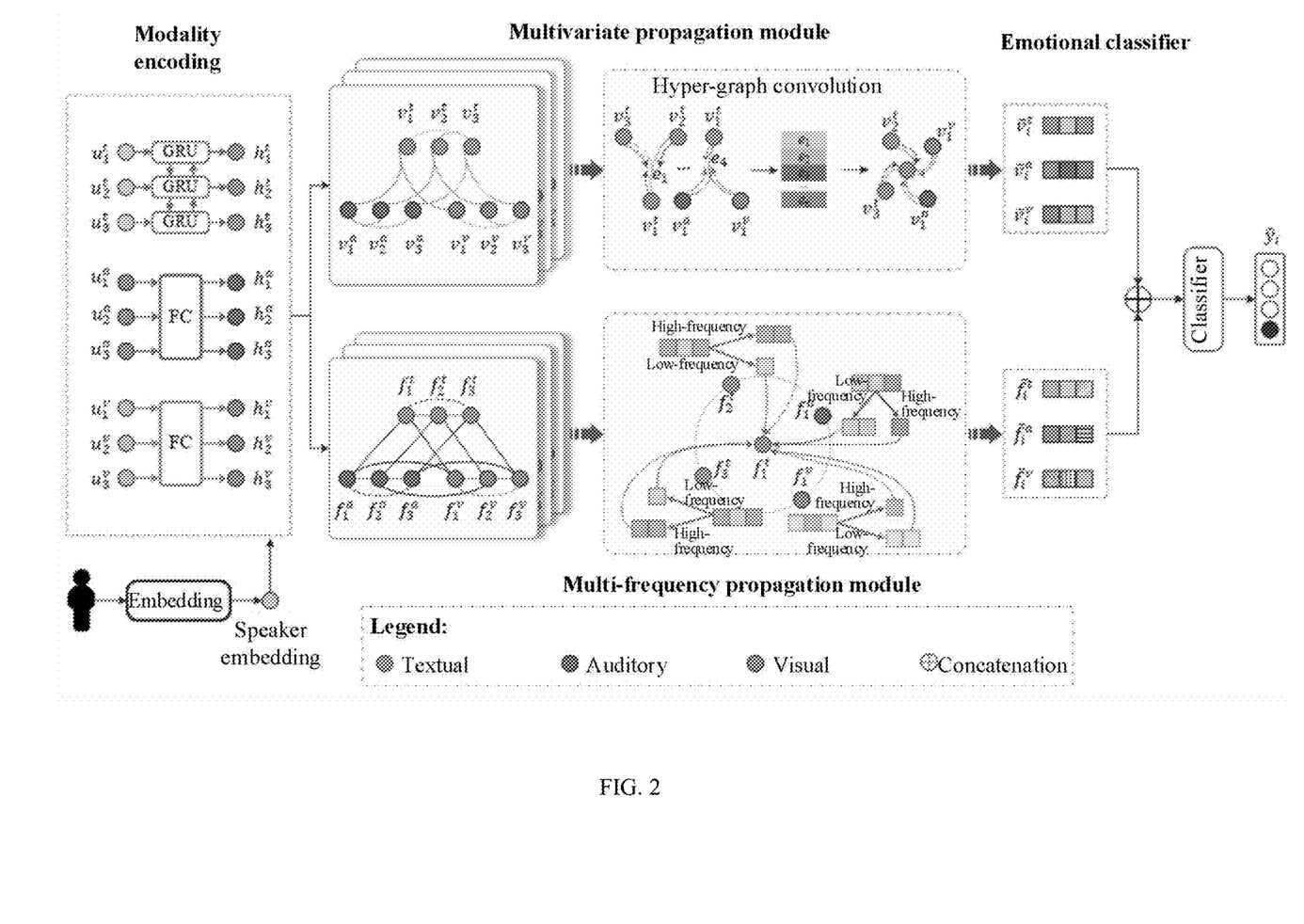
FIG. 2 is a schematic diagram of a system for multimodal ERC based on a GNN according to the present disclosure.

As shown in FIG. 2, each first node $v_i^x (x \in \{t, a, v\})$ is first connected to all other utterances $v_j^x (j \in [1, N], j \neq i)$ in the same modality of the same conversation through a contextual hyper-edge. In addition, each first node $v_i^x$ is connected to other modalities $v_i^z (z \in \{t, a, v\}, z \neq x)$ of the same utterance through a multimodal hyper-edge. In this way, the hyper-graph constructed can capture high-order and multivariate information beyond pairwise combinations S23. A weight is assigned to each node connected to each of the multimodal hyper-edge and the contextual hyper-edge, and a weight is assigned to each of the multimodal hyper-edge and the contextual hyper-edge.

The existing GNN-based ERC models manually adjust the edge weighting strategy through a complex relationship learning or similarity metric. In contrast, the present disclosure employs randomly initialized weights to avoid unnecessary complexity of the model. Specifically, the present disclosure defines two types of weights in the hyper-graph.

i) The weight $\omega(e)$ of each hyper-edge e.

ii) The weight $\gamma_e(v)$ (also known as edge-dependent weight) of each node v connected to the hyper-edge e.

Intuitively, $\gamma_e(v)$ measures the contribution of the node v to the hyper-edge e, thereby enhancing the fine-grained multimodal and contextual dependencies. Therefore, the edge-dependent node weight can be expressed by weighted incidence matrix $\hat{H} \in \mathbb{R}^{|V_H| \times |\varepsilon_H|}$:

$$\hat{H} = \begin{cases} \gamma_e(v), & \text{if the hyper-edge } e \text{ is connected to the node } v; \\ 0, & \text{others} \end{cases}$$

S24. A hyper-graph is generated based on each of the first nodes, each of the multimodal hyper-edge and the contextual hyper-edge, the weight assigned to each node connected to each of the multimodal hyper-edge and the contextual hyper-edge, and the weight assigned to each of the multimodal hyper-edge and the contextual hyper-edge.

S25. A first node convolution is performed on the hyper-graph, hyper-edge embedding is updated by aggregating a node feature, and a hyper-edge convolution is performed to propagate a hyper-edge message to the first node.

$$V^{(l+1)} = \sigma\left(D_H^{-1} H W_e B^{-1} \hat{H}^T V^{(l)}\right)$$

$V^{(l)}$ denotes an input into an l-th layer of a hyper-graph neural network, $$V^{(l)} = \{v_{i,(l)}^x \mid i \in [1, N], x \in \{t, a, v\}\} \in \mathbb{R}^{|v_H| \times D_h};$$

$v_{i,(l)}^x$ denotes a node in the l-th layer of the hyper-graph neural network; $v_H$ denotes a set of nodes in the hyper-graph; $D_h$ denotes a feature dimension of nodes in a hidden layer in the hyper-graph neural network; $\sigma(\ )$ denotes a nonlinear activation function; $W_e$ denotes a hyper-edge weight matrix, $W_e = \text{diag}(w(e_1), \ldots, w(e_{|\varepsilon_H|}))$; diag( ) denotes a diagonal matrix; w( ) denotes the weight; $e_1$ denotes a first hyper-edge; $e_{|\varepsilon_H|}$ denotes the hyper-edge $|\varepsilon_H|$; $\varepsilon_H$ denotes a set of hyper-edges in the hyper-graph; $D_H \in \mathbb{R}^{|v_H| \times |v_H|}$ and $B \in \mathbb{R}^{|\varepsilon_H| \times |\varepsilon_H|}$ denote a node degree matrix and a hyper-edge degree matrix, respectively; H denotes a hyper-graph node and edge connection incidence matrix, $H \in \mathbb{R}^{|v_H| \times |\varepsilon_H|}$; $\hat{H}$ denotes a weighted incidence matrix, $$\hat{H} = \begin{cases} \gamma_e(v), & \text{if the hyper-edge } e \text{ is connected to the node } v; \\ 0, & \text{others} \end{cases};$$

and T denotes a transpose operation.

S26. Step S25 is repeated until a last iteration, and taking an output of the last iteration as the multivariate representation data.

After L iterations, the output $v_{i,(L)}^x$ of the last iteration is taken as the multivariate representation data.

$$\overline{v_i^t} = v_{i,(L)}^t, \overline{v_i^a} = v_{i,(L)}^a, \overline{v_i^v} = v_{i,(L)}^v.$$

S3. Different importance of different cross-modal and cross-context frequency components is extracted to acquire multi-frequency representation data.

The above multivariate propagation module can capture high-order dependencies beyond pairwise combinations, but it still follows the universal graph learning protocol of aggregating and smoothing signals from a neighborhood. This can be explained as a form of low-pass filter, where the smoothing feature is essentially to propagate the low-frequency message while erasing the high-frequency message. However, as previously mentioned, the high-frequency message reflecting the emotional difference between nodes is crucial, and the effect of combining messages of different frequencies is worth exploring. Therefore, the present disclosure proposes a multi-frequency propagation module to extract different frequency components with different importance. For this purpose, the present disclosure constructs undirected graph $g=(v_g, \varepsilon_g)$ based on sequentially encoded utterances, in parallel with the multivariate module.

Specifically, the present disclosure constructs undirected graph $g=(v_g, \varepsilon_g)$, with node $v_g$ being the same as that in H, denoted as $\{f_i^t, f_i^a, f_i^v\}$. Node embedding is also initialized through the sequentially encoded representation $\{h_i^t, h_i^a, h_i^v\}$. The present disclosure constructs a set of edges $\varepsilon_g$ with paired connections, unlike H. Similarly, the present disclosure connects each node $f_i^x$ to all other utterances $\{f_j^x | j \in [1, N], j \neq i\}$ of the same modality in the same conversation, as well as other modalities $\{f_i^z | z \in \{t, a, v\}, z \neq x\}$ of the same utterance. The process is as follows.

S31. Multiple second nodes are determined based on the single-modal representation perceived by the speaker and the context.

S32. An undirected graph is constructed based on all the second nodes.

The undirected graph is shown in FIG. 2. An adjacency matrix of the undirected graph is expressed as: $A \in \mathbb{R}^{|v_g| \times |v_g|}$. A normalized graph Laplacian matrix of the undirected graph is expressed as: $L = I - D_g^{-1/2} A D_g^{-1/2}$, where $D_g$ denotes a diagonal degree matrix; I denotes an identity matrix; A denotes the adjacency matrix of the undirected graph; and $v_g$ denotes a node set in the graph.

S33. A high-frequency message and a low-frequency message of a feature of a current node in the undirected graph are extracted respectively by a high-pass filter and a low-pass filter.

The present disclosure designs low-pass filter $F_l$ and high-pass filter $F_h$ to extract signals from the node feature.

$$F_l = I + D_g^{-1/2} A D_g^{-1/2} = 2I - L$$

$$F_h = I - D_g^{-1/2} A D_g^{-1/2} = L$$

It can be noted that the high-pass filter is equivalent to the normalized graph Laplacian matrix, which is consistent with the theory of using a Laplacian kernel to highlight high-frequency edge information in image signal processing. According to the graph Fourier transform (GET) theory, given signal φ, the filtering operation of $F_l$ and $F_h$ can be regarded as a convolution *c between φ and a corresponding convolution kernel.

$$F_l * c\varphi = F_l \cdot \varphi, F_h * c\varphi = F_h \cdot \varphi$$

Specifically, both $F_l$ and $F_h$ are filters. When the signal φ is given, filtering the signal φ through these two filters can be regarded as a convolution between φ and the convolutional kernel corresponding to the filter.

S34. The high-frequency message and the low-frequency message are combined through a weighted sum.

$$F^{(k+1)} = R^l(F_l \cdot F^{(k)}) + R^h(F_h \cdot F^{(k)}) = F^{(k)} + (R^l - R^h) D_g^{-1/2} A D_g^{-1/2} F^{(k)}$$

$F^{(k)}$ denotes an input into a k-th layer, $$F^{(k)} = \{f_{i,(k)}^x | i \in [1, N], x \in \{t, a, v\}\} \in \mathbb{R}^{|v_g| \times D_h};$$

$R^l$, $R^h \in \mathbb{R}^{|v_g| \times |v_g|}$ denotes weight matrices of the low-frequency message and the high-frequency message, respectively; and the above equation is rewritten as:

$$f_{i,(k+1)} = f_{i,(k)} + \sum_{j \in N_i} \frac{r_{ij}^l - r_{ij}^h}{\sqrt{|N_j|}\sqrt{|N_i|}} f_{j,(k)}$$

$N_i$ denotes a neighboring node of a node i; $N_j$ denotes a neighboring node of a node j, and $r_{ij}^l$ and $r_{ij}^h$ denote contributions of a low-frequency message and a high-frequency message of the node j to the node i, respectively, where $r_{ij}^l + r_{ij}^h = 1$.

S35. A correlation between the current node and a neighboring node is considered based on contributions of a high-frequency signal and the low-frequency message of the neighboring node to a weight of the current node, dominant information of the current node is determined, and whether to receive differential information between the current node and the neighboring node is determined.

A correlation between a central node and a neighboring node is considered:

$$r_{ij}^l - r_{ij}^h = \tanh(W_3(f_{i,(k)} \oplus f_{j,(k)}))$$

$\oplus$ denotes a tensor concatenation operation; $W_3 \in \mathbb{R}^{2D_h \times 1}$ denotes a trainable weight matrix; tanh( ) denotes a hyperbolic tangent function, limited to $[-1,1]$. In this way, the coefficient $r_{ij}^l - r_{ij}^h$ can easily simulate the different importance of different frequency components. For example, if $r_{ij}^l - r_{ij}^h < 0$, the high-frequency message dominates, and the node i receives differential information between the node i and the neighboring node j (i.e. $f_{i,(k)} - f_{j,(k)}$); vice versa.

S36. The dominant information and the differential information are propagated to the entire undirected graph, and K layers are stacked, such that each of the second nodes receives a multi-frequency signal from a K-hop neighboring node.

S37. An output of a last layer is taken as the multi-frequency representation data.

$$\overline{f_i^t} = f_{i,(K)}^t, \overline{f_i^a} = f_{i,(K)}^a, \overline{f_i^v} = f_{i,(K)}^v.$$

S4. The multivariate representation data and the multi-frequency representation data are fused to acquire an emotional representation of each utterance in an input conversation.

$$e_i = \overline{v_i^t} \oplus \overline{f_i^t} \oplus \overline{v_i^a} \oplus \overline{f_i^a} \oplus \overline{v_i^v} \oplus \overline{f_i^v}$$

S5. A prediction label is acquired for each utterance in the input conversation based on the emotional representation, and the prediction label is output as a multimodal ERC result.

$$\hat{y}_l = \arg\max_\tau(P_i[\tau])$$

$\hat{y}_l$ denotes the prediction label of the input conversation; $P_i = \text{soft max}(W_4 \tilde{e}_i + b_4)$; $W_4$ denotes a trainable weight matrix; $\tilde{e}_l$ denotes a normalized emotional representation, $\tilde{e}_l = \text{ReLU}(e_i)$; $e_i$ denotes an emotional feature of the i-th utterance in the input conversation; $P_i[\tau]$ denotes a probability value of a τ-th category; τ denotes the τ-th category; $b_4$ denotes a bias of the trainable weight matrix; $v_i^x$, $i \in [1, N]$, $x \in \{t, a, v\}$ denotes the multivariate representation data; and $f_i^x$, $i \in [1, N]$, $x \in \{t, a, v\}$ denotes the multi-frequency representation data.

The present disclosure follows a conventional setting and uses a categorical cross-entropy with $L_2$ regularization as the loss function.

$$L = -\frac{1}{\sum_{s=1}^{Num} c(s)} \sum_{i=1}^{Num} \sum_{j=1}^{c(i)} \log p_{ij}[y_{i,j}] + \lambda \|\theta\|_2$$

Num denotes a number of conversations; c(i) denotes a number of utterances in a conversation i; $p_{ij}$ and $y_{i,j}$ denote a probability distribution of a prediction label and a real label for an utterance j in the conversation i, respectively; λ denotes a weight of $L_2$ regularization; θ denotes all trainable model parameters; and c(s) denotes a number of utterances in a conversation s.

The present disclosure further provides a system for multimodal ERC based on a GNN, based on the method for multimodal ERC based on a GNN, and including a modality encoding module, a multivariate propagation module, a multi-frequency propagation module, and an emotional classification module.

The modality encoding module is configured to acquire a single-modal representation perceived by a speaker and a context of a conversation.

The multivariate propagation module is configured to extract cross-modal and cross-context multivariate and high-order information based on the single-modal representation perceived by the speaker and the context to acquire multivariate representation data.

The multi-frequency propagation module is configured to extract different importance of different cross-modal and cross-context frequency components to acquire multi-frequency representation data.

The emotional classification module is configured to fuse the multivariate representation data and the multi-frequency representation data to acquire an emotional representation of each utterance in an input conversation, acquire a prediction label for each utterance in the input conversation based on the emotional representation, and output the prediction label as a multimodal ERC result.

Embodiment 2

The present disclosure proposes a model ($M^3$Net) of a multimodal ERC system. The performance of the multimodal ERC system is verified on two popular multimodal datasets, IEMOCAP and MELD, with three modalities, namely textual, visual, and auditory. The present disclosure conducts the verification with the pre-extracted single-modal features, and follows the same extraction procedure as in previous work.

The proposed model is implemented through PyTorch and torch-geometric. The model is trained on a machine with a display card NVIDIA Geforce RTX 3090. Accuracy and F1 score are used to measure the performance. The model is trained through an Adam optimizer, with a batch size of 16 on the two datasets. L and K are tested within a range of 1 to 7, to present the best performance results. The complete details of the hyper-parameters of the two datasets are shown in Table 1.

TABLE 1

Details of hyper-parameters

| Dataset | Batch | Optimizer | $D_h$ | L | K | Dropout |
|---------|-------|-----------|-------|---|---|---------|
| IEMOCAP | 16 | Adam (learning rate = 1e-4) | 512 | 3 | 4 | 0.5 |
| MELD | 16 | Adam (learning rate = 1e-4) | 512 | 3 | 3 | 0.4 |

The present disclosure compares the proposed model with the most advanced existing methods, and the results are shown in Table 2. It can be seen that on these two datasets, M³Net surpasses previous methods and achieves state-of-the-art records in both the accuracy and F1 score. In particular, M³Net outperforms previous GNN-based methods, including DialogueGCN, MMGCN, and MM-DFN, which manually adjust the edge weighting strategy through a complex relationship learning or similarity metric so as to capture the multimodal and contextual relationships. It can be seen that the advantage of the present disclosure lies in the study of the cross-modal and cross-context multivariate and multi-frequency message, which was overlooked by previous methods.

TABLE 2

Comparison of the proposed model with existing advanced methods on IEMOCAP and MELD

|  | Method | Network | IEMOCAP | | MELD | |
|--|--------|---------|---------|----|------|----|
|  |        |         | Accuracy | F1 | Accuracy | F1 |
| GloVe | CMN | Not based on GNN | — | 58.50 | — | — |
|  | ICON | Not based on GNN | 64.00 | 63.50 | — | — |
|  | DialogueRNN | Not based on GNN | 63.51 | 62.90 | 59.92 | 57.60 |
|  | MetaDrop | Not based on GNN | 65.76 | 65.58 | — | 58.30 |
|  | DialogueGCN | Based on GNN | 66.17 | 66.24 | 57.01 | 55.59 |
|  | MMGCN | Based on GNN | 65.80 | 65.41 | 60.42 | 58.31 |
|  | MM-DFN | Based on GNN | 68.21 | 68.18 | 59.81 | 58.42 |
|  | M³Net | Based on GNN | 69.50 | 69.08 | 61.65 | 59.22 |
| RoBERTa | DialogueGCN | Based on GNN | 63.96 | 64.44 | 63.49 | 62.78 |
|  | MMGCN | Based on GNN | 66.79 | 66.99 | 66.63 | 65.13 |
|  | DialogueRNN | Not based on GNN | 68.64 | 68.72 | 65.94 | 65.31 |
|  | MetaDrop | Not based on GNN | 69.38 | 69.59 | 66.63 | 66.30 |
|  | MM-DFN | Based on GNN | 69.87 | 69.48 | 67.01 | 66.17 |
|  | M³Net | Based on GNN | 72.46 | 72.49 | 68.28 | 67.05 |

(Bold Indicates Optimal Performance;)

The present disclosure conducts ablation research on the key components of M³Net to explore the effectiveness of each constituent module, and the results are shown in Table 3.

TABLE 3

|   | Method | IEMOCAP | | MELD | |
|---|--------|---------|----|------|----|
|   |        | Accuracy | F1 | Accuracy | F1 |
|   | M³Net | 72.46 | 72.49 | 68.28 | 67.05 |
| 1 | Remove multivariate information | 70.06 | 70.05 | 67.74 | 66.36 |
| 2 | Remove multi-frequency information | 69.87 | 69.74 | 67.36 | 66.03 |
| 3 | Remove hyper-edge weight $\omega(e)$ | 70.30 | 70.45 | 68.11 | 66.99 |
| 4 | Remove node weight $\gamma_e(v)$ | 70.98 | 71.02 | 68.05 | 66.92 |
| 5 | Remove two types of weights | 70.12 | 70.09 | 67.89 | 66.75 |
| 6 | H → g concatenation | 68.39 | 68.44 | 68.20 | 66.84 |
| 7 | g → H concatenation | 68.50 | 69.70 | 68.05 | 66.85 |

The Role of Multivariate Information

The present disclosure first explores the role of the cross-modal and cross-context multivariate information. For this purpose, the present disclosure removes the multivariate propagation module (i.e. the hyper-graph H) and only performs classification based on the multi-frequency representation, which is shown as variant 1 in Table 3. Under this setting, the accuracy decreases by 2.40% and the F1 score decreases by 2.44% on IEMOCAP. In addition, the accuracy decreases by 0.54% and the F1 score decreases by 0.69% on MELD. This proves the effectiveness of introducing multivariate propagation, which can effectively encode the multivariate relationships.

The Role of Multi-Frequency Message

Another core component of M³Net is the multi-frequency propagation module. Similarly, the present disclosure removes the module, and only uses multivariate representation to perform predictions, in order to test the importance of the module. Variant 2 shows the result of this configuration, and a sharp decrease in the performance is observed. This proves the effectiveness of introducing different frequencies of messages in ERC, which can guide the model to capture the different importance of emotional differences and emotional commonalities in a local neighborhood.

The Role of Weights in Hyper-Graph

Two types of weights are defined in the hyper-graph H to capture the fine-grained multivariate relationship. Therefore, the present disclosure conducts experiments to verify the effectiveness of these two weights. It can be seen that from variants 3 to 5, deleting one or two weights (i.e. setting the weight $\omega(e)$ or/and $\gamma_e(v)$ to 1) will impair the performance on the two datasets. This indicates that the set weights are beneficial for training.

The Role of Parallel Modeling

In M³Net, the multivariate and multi-frequency messages are propagated in parallel. Parallel modeling is compared with two-step serial modeling, and the results are shown as variants 6 and 7, respectively. Serial modeling slightly reduces the performance on MELD, and significantly reduces the performance on IEMOCAP, indicating that parallel modeling is effective.

Figure 3:
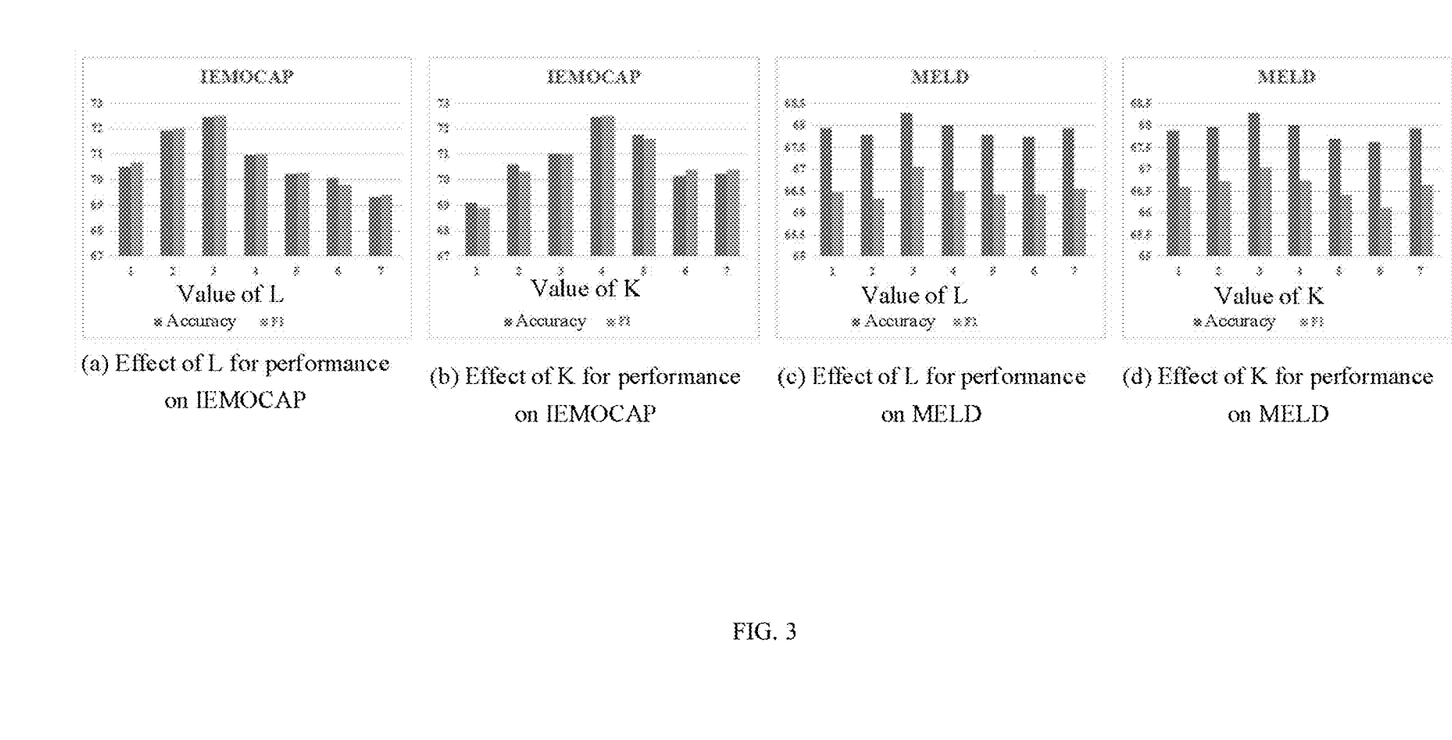
FIG. 3 is a schematic diagram showing results, corresponding to different number of layers, of the system for multimodal ERC according to the present disclosure.

M³Net includes two parallel graphs, and graph propagation plays a crucial role. In order to study the influence of the number of layers of stacked, the present disclosure conducts grid search on the number of layers. Specifically, the number of layers of multivariate propagation (L) and multi-frequency propagation (K) are searched within the range of 1 to 7, and the results are shown in FIG. 3. On IEMOCAP, the effects of L and K are similar. At first, as more layers are stacked, the results steadily improve, with peaks appearing at L=3 and K=4, respectively. Further stacking of more layers has almost no positive impact on the performance. On the other hand, the results on MELD are not very sensitive to the number of layers and do not have special patterns, as both shallow and deep layers can produce good performance.

Figure 4:
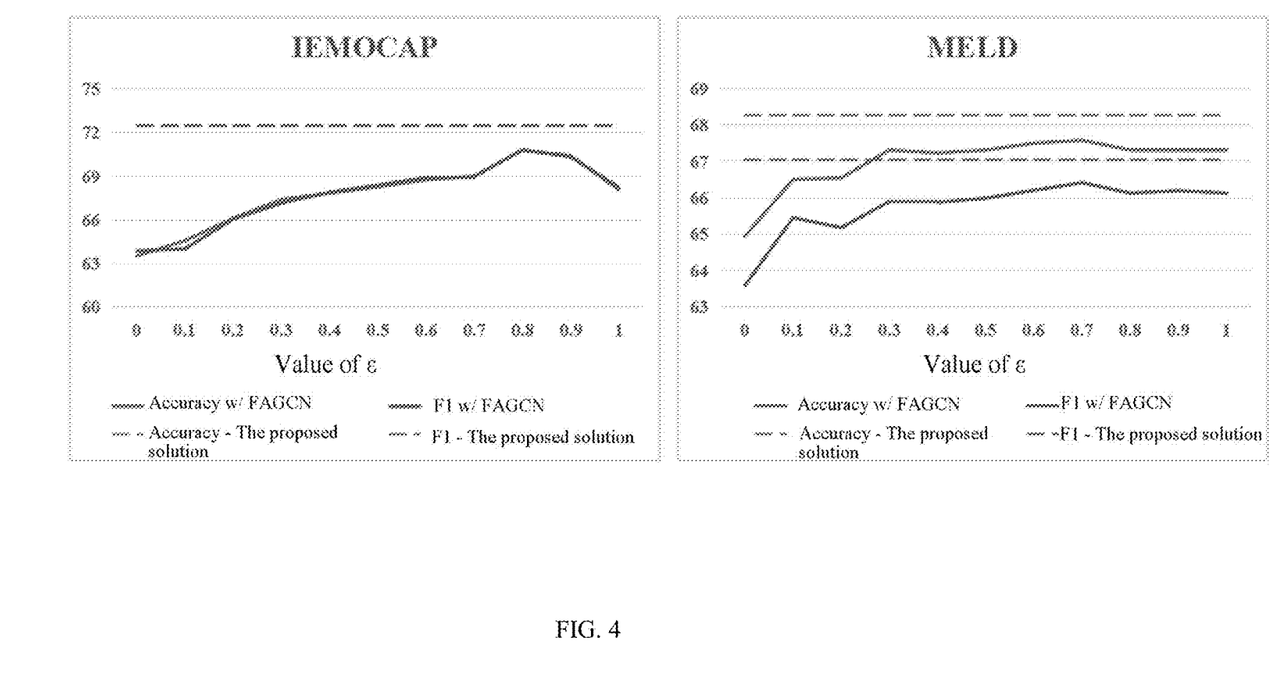
FIG. 4 is a performance comparison of the system for multimodal ERC with a frequency adaptation graph convolutional network (FAGCN) according to the present disclosure.

As previously mentioned, the graph propagation rules of the multi-frequency module are closely related to a frequency adaptation graph convolutional network (FAGCN), but there are important differences. To further demonstrate the effectiveness of the proposed method, additional experimental comparisons with FAGCN are presented. Specifically, the multivariate module is retained, and the multi-frequency modeling strategy (Step S3) is replaced with the strategy proposed in FAGCN. Because FAGCN introduces hyper-parameter $\epsilon \in [0,1]$ when defining the filter, $\epsilon$ is tested in a step of 0.1 within the range of [0,1]. The comparison results are shown in FIG. 4. Obviously, $\epsilon$ is a crucial factor that greatly affects the performance, especially on IEMOCAP. However, in any case, these variants with FAGCN cannot outperform the original M³Net. This indicates the superiority of the multi-frequency modeling mechanism of the present disclosure.

The above are merely preferred examples of the present disclosure, and are not intended to limit the present disclosure. Any modifications, equivalent replacements, improvements, and the like made within the spirit and principle of the present disclosure shall be all included in the protection scope of the present disclosure.

What is claimed is:

1. A method for multimodal emotion recognition in conversation (ERC) based on a graph neural network (GNN), comprising:
   acquiring a single-modal representation perceived by a speaker and a context of a conversation, wherein the single-modal representation comprises textual, visual, and auditory single-modal representations;
   extracting cross-modal and cross-context multivariate and high-order information based on the single-modal representation perceived by the speaker and the context to acquire multivariate representation data;
   extracting different importance of different cross-modal and cross-context frequency components to acquire multi-frequency representation data;
   fusing, by the GNN, the multivariate representation data and the multi-frequency representation data to acquire an emotional representation of each utterance in an input conversation; and
   acquiring, by the GNN, a prediction label for each utterance in the input conversation based on the emotional representation, and outputting the prediction label as a multimodal ERC result,
   wherein the extracting cross-modal and cross-context multivariate and high-order information comprises:
      determining multiple first nodes of the GNN based on the single-modal representation perceived by the speaker and the context;
      constructing a multimodal hyper-edge and a contextual hyper-edge for each of the first nodes;
      assigning a weight to each node connected to each of the multimodal hyper-edge and the contextual hyper-edge and a weight to each of the multimodal hyper-edge and the contextual hyper-edge;
      generating a hyper-graph based on each of the first nodes, each of the multimodal hyper-edge and the contextual hyper-edge, the weight assigned to each node connected to each of the multimodal hyper-edge and the contextual hyper-edge, and the weight assigned to each of the multimodal hyper-edge and the contextual hyper-edge;
      performing a first node convolution on the hyper-graph, updating hyper-edge embedding by aggregating a node feature, and performing a hyper-edge convolution to propagate a hyper-edge message to the first node; and
      repeating step S25 until a last iteration, and taking an output of the last iteration as the multivariate representation data.

2. The method for multimodal ERC based on the GNN according to claim 1, wherein the acquiring a single-modal representation perceived by a speaker and a context of a conversation comprises:
   encoding, by a bidirectional gated recurrent unit (GRU), a textual feature of the input conversation to acquire textually encoded data;
   encoding, by a first fully connected network and a second fully connected network, auditory and visual features of the input conversation, respectively, to acquire visually encoded data and auditorily encoded data;
   calculating an embedding representation of the speaker; and
   acquiring the textual, visual, and auditory single-modal representations respectively based on the textually encoded data, the visually encoded data, the auditorily encoded data, and the embedding representation.

3. The method for multimodal ERC based on the GNN according to claim 2, wherein the encoding, by the GRU, a textual feature of the input conversation comprises utilizing:

$$c_i^t = \overleftarrow{GRU}(u_i^t, c_{i(+,-)1}^t)$$

the encoding, by the first fully connected network and the second fully connected network, auditory and visual features of the input conversation, respectively, comprises utilizing:

$$c_i^a = W_1 u_i^a + b_i^a$$
$$c_i^v = W_2 u_i^v + b_i^v$$

wherein $c_i^t$ denotes the textually encoded data; $c_i^a$ denotes the auditorily encoded data; $c_i^v$ denotes the visually encoded data; $\overrightarrow{GRU}(\ )$ denotes a function of the bidirectional GRU; $u_i^t$ denotes the textual feature of an i-th utterance in the input conversation; $c_{i(+,-)1}^t$ indicates $c_{i+1}^t$ or $c_{i-1}^t$, denoting a preceding text or a subsequent text of a text input into the bidirectional GRU $\overleftarrow{GRU}(\ )$; $W_1$ denotes the first fully connected network; $u_i^a$ denotes the auditory feature of the i-th utterance in the input conversation; $b_i^a$ denotes an auditory bias; $W_2$ denotes the second fully connected network; $u_i^v$ denotes the visual feature of the i-th utterance in the input conversation; and $b_i^v$ denotes a visual bias;

the calculating the embedding representation of the speaker comprises utilizing:

$$S_i = W_s s_i$$

wherein $S_i$ denotes an embedding feature of the speaker in an i-th round of conversation; $W_s$ denotes a trainable weight; and $s_i$ denotes a one-hot vector, referring to each speaker;

the acquiring the textual, visual, and auditory single-modal representations respectively comprises utilizing:

$$h_i^x = c_i^x + S_i, x \in \{t, a, v\}$$

wherein $h_i^x$ denotes a single-modal representation perceived by the speaker and the context of the i-th round of conversation; when x=t, $c_i^x$ denotes the textually encoded data; when x=a, $c_i^x$ denotes the auditorily encoded data; and when x=v, $c_i^x$ denotes the visually encoded data, and $S_i$ denotes the embedding representation of the speaker.

4. The method for multimodal ERC based on the GNN according to claim 3, wherein a loss function L of the multimodal ERC method based on the GNN is expressed as follows:

$$L = -\frac{1}{\sum_{s=1}^{Num} c(s)} \sum_{i=1}^{Num} \sum_{j=1}^{c(i)} \log p_{ij}[y_{i,j}] + \lambda \|\theta\|_2$$

wherein Num denotes a number of conversations; c(i) denotes a number of utterances in a conversation i; $p_{ij}$ and $y_{i,j}$ denote a probability distribution of a prediction label and a real label for an utterance j in the conversation i, respectively; λ denotes a weight of $L_2$ regularization; θ denotes all trainable model parameters; and c(s) denotes a number of utterances in a conversation s.

5. The method for multimodal ERC based on the GNN according to claim 2, wherein a loss function L of the multimodal ERC method based on the GNN is expressed as follows:

$$L = -\frac{1}{\sum_{s=1}^{Num} c(s)} \sum_{i=1}^{Num} \sum_{j=1}^{c(i)} \log p_{ij}[y_{i,j}] + \lambda \|\theta\|_2$$

wherein Num denotes a number of conversations; c(i) denotes a number of utterances in a conversation i; $p_{ij}$ and $y_{i,j}$ denote a probability distribution of a prediction label and a real label for an utterance j in the conversation i, respectively; λ denotes a weight of $L_2$ regularization; θ denotes all trainable model parameters; and c(s) denotes a number of utterances in a conversation s.

6. The method for multimodal ERC based on the GNN according to claim 1, wherein the performing the first node convolution on the hyper-graph, the updating hyper-edge embedding by aggregating a node feature, and the performing a hyper-edge convolution to propagate a hyper-edge message to the first node comprises utilizing:

$$V^{(l+1)} = \sigma\left(D_H^{-1} H W_e B^{-1} \hat{H}^T V^{(l)}\right)$$

wherein $V^{(l)}$ denotes an input into an l-th layer of a hyper-graph neural network, $$V^{(l)} = \{v_{i,(l)}^x | i \in [1, N], x \in \{t, a, v\}\} \in \mathbb{R}^{|v_H| \times D_h};$$

denotes a node in the l-th layer of the hyper-graph neural network; $v_H$ denotes a set of nodes in the hyper-graph; $D_h$ denotes a feature dimension of nodes in a hidden layer in the hyper-graph neural network; σ( ) denotes a nonlinear activation function; $W_e$ denotes a hyper-edge weight matrix, $W_e = \text{diag}(w(e_1), \ldots, w(e_{|\varepsilon_H|}))$; diag( ) denotes a diagonal matrix; w( ) denotes the weight; $e_1$ denotes a first hyper-edge; $e_{|\varepsilon_H|}$ denotes the hyper-edge $|\varepsilon_H|$; $\varepsilon_H$ denotes a set of hyper-edges in the hyper-graph; $D_H \in \mathbb{R}^{|v_H| \times |v_H|}$ and $B \in \mathbb{R}^{|\varepsilon_H| \times |\varepsilon_H|}$ denote a node degree matrix and a hyper-edge degree matrix, respectively; H denotes a hyper-graph node and edge connection incidence matrix, $H \in \mathbb{R}^{|v_H| \times |\varepsilon_H|}$; $\hat{H}$ denotes a weighted incidence matrix, $$\hat{H} = \begin{cases} \gamma_e(v), & \text{if the hyper-edge } e \text{ is connected to the node } v; \\ 0, & \text{others} \end{cases};$$

and T denotes a transpose operation.

7. The method for multimodal ERC based on the GNN according to claim 1, wherein the extracting the different importance of different cross-modal and cross-context frequency components comprises:
determining multiple second nodes based on the single-modal representation perceived by the speaker and the context;
constructing an undirected graph based on all the second nodes;

extracting, by a high-pass filter and a low-pass filter, a high-frequency message and a low-frequency message of a feature of a current node in the undirected graph, respectively;

combining the high-frequency message and the low-frequency message through a weighted sum;

considering a correlation between the current node and a neighboring node based on contributions of a high-frequency signal and the low-frequency message of the neighboring node to a weight of the current node, determining dominant information of the current node, and determining whether to receive differential information between the current node and the neighboring node;

propagating the dominant information and the differential information to the entire undirected graph, and stacking K layers, such that each of the second nodes receives a multi-frequency signal from a K-hop neighboring node; and taking an output of a last layer as the multi-frequency representation data.

8. The method for multimodal ERC based on the GNN according to claim 7, wherein in the constructing an undirected graph, an adjacency matrix of the undirected graph is expressed as: $A \in \mathbb{R}^{|v_g| \times |v_g|}$;

a normalized graph Laplacian matrix of the undirected graph is expressed as: $L = I - D_g^{-1/2} A D_g^{-1/2}$; $D_g$ denotes a diagonal degree matrix; I denotes an identity matrix; A denotes the adjacency matrix of the undirected graph; and $v_g$ denotes a node set in the graph;

the combining the high-frequency message and the low-frequency message step S34 comprises utilizing:

$$F^{(k+1)} = R^l(F_l \cdot F^{(k)}) + R^h(F_h \cdot F^{(k)}) = F^{(k)} + (R^l - R^h)D_g^{-1/2}AD_g^{-1/2}F^{(k)}$$

wherein $F^{(k)}$ denotes an input into a k-th layer, $$F^{(k)} = \{f_{i,(k)}^x | i \in [1, N], x \in \{t, a, v\}\} \in \mathbb{R}^{|v_g| \times D_h};$$

$R^l, R^h \in \mathbb{R}^{|v_g| \times |v_g|}$ denotes weight matrices of the low-frequency message and the high-frequency message, respectively; and the above equation is rewritten as:

$$f_{i,(k+1)} = f_{i,(k)} + \sum_{j \in N_i} \frac{r_{ij}^l - r_{ij}^h}{\sqrt{|N_j|}\sqrt{|N_i|}} f_{i,(k)}$$

wherein $N_i$ denotes a neighboring node of a node i; $N_j$ denotes a neighboring node of a node j; and $r_{ij}^l$ and $r_{ij}^h$ denote contributions of a low-frequency message and a high-frequency message of the node j to the node i, respectively, where $r_{ij}^l + r_{ij}^h = 1$.

9. The method for multimodal ERC based on the GNN according to claim 1, wherein the fusing, by the GNN, the multivariate representation data and the multi-frequency representation data comprises utilizing:

$$e_i = \overline{v_i^t} \oplus \overline{f_i^t} \oplus \overline{v_i^a} \oplus \overline{f_i^a} \oplus \overline{v_i^v} \oplus \overline{f_i^v}$$

the acquiring, by the GNN, the prediction label for each utterance in the input conversation comprises utilizing:

$$\hat{y}_i = \arg\max_\tau(P_i[\tau])$$

wherein $\hat{y}_i$ denotes the prediction label of the input conversation; $P_i$=soft max $(W_4 \tilde{e}_i + b_4)$; $W_4$ denotes a trainable weight matrix; $\tilde{e}_i$ denotes a normalized emotional representation, $\tilde{e}_i$=ReLU$(e_i)$; $e_i$ denotes an emotional feature of the i-th utterance in the input conversation; $P_i[\tau]$ denotes a probability value of a τ-th category; τ denotes the τ-th category; $b_4$ denotes a bias of the trainable weight matrix; $v_i^x$, $i \in [1, N]$, $x \in \{t, a, v\}$ denotes the multivariate representation data; and $f_i^x$, $i \in [1, N]$, $x \in \{t, a, v\}$ denotes the multi-frequency representation data.

10. The method for multimodal ERC based on the GNN according to claim 1, wherein a loss function L of the multimodal ERC method based on the GNN is expressed as follows:

$$L = -\frac{1}{\sum_{s=1}^{Num} c(s)} \sum_{i=1}^{Num} \sum_{j=1}^{c(i)} \log p_{ij}[y_{i,j}] + \lambda \|\theta\|_2$$

wherein Num denotes a number of conversations; c(i) denotes a number of utterances in a conversation i; $p_{ij}$ and $y_{i,j}$ denote a probability distribution of a prediction label and a real label for an utterance j in the conversation i, respectively; λ denotes a weight of $L_2$ regularization; θ denotes all trainable model parameters; and c(s) denotes a number of utterances in a conversation s.

11. A system for multimodal ERC based on a GNN, based on the method for multimodal ERC based on the GNN according to claim 1, and comprising:

a modality encoding module, configured to acquire a single-modal representation perceived by a speaker and a context of a conversation;

a multivariate propagation module, configured to extract cross-modal and cross-context multivariate and high-order information based on the single-modal representation perceived by the speaker and the context to acquire multivariate representation data;

a multi-frequency propagation module, configured to extract different importance of different cross-modal and cross-context frequency components to acquire multi-frequency representation data; and an emotional classification module, implemented by the GNN, wherein the GNN, in implementing the emotional classification module, is configured to fuse the multivariate representation data and the multi-frequency representation data to acquire an emotional representation of each utterance in an input conversation, acquire a prediction label for each utterance in the input conversation based on the emotional representation, and output the prediction label as a multimodal ERC result wherein the multivariate propagation module is further configured to determine multiple first nodes of the GNN based on the single-modal representation perceived by the speaker and the context;

construct a multimodal hyper-edge and a contextual hyper-edge for each of the first nodes;

assign a weight to each node connected to each of the multimodal hyper-edge and the contextual hyper-edge and a weight to each of the multimodal hyper-edge and the contextual hyper-edge;

generate a hyper-graph based on each of the first nodes, each of the multimodal hyper-edge and the contextual hyper-edge, the weight assigned to each node connected to each of the multimodal hyper-edge and the contextual hyper-edge, and the weight assigned to each of the multimodal hyper-edge and the contextual hyper-edge;

perform a first node convolution on the hyper-graph, update hyper-edge embedding by aggregating a node feature, and perform a hyper-edge convolution to propagate a hyper-edge message to the first node; and repeat performing first node convolution on the hyper-graph, updating hyper-edge embedding by aggregating a node feature, and performing a hyper-edge convolution to propagate a hyper-edge message to the first node until a last iteration, and take an output of the last iteration as the multivariate representation data.

12. The system for multimodal ERC based on the GNN according to claim 11, wherein in the method for multimodal ERC based on the GNN, the acquiring a single-modal representation perceived by a speaker and a context of a conversation comprises:

encoding, by a bidirectional gated recurrent unit (GRU), a textual feature of the input conversation to acquire textually encoded data;

encoding, by a first fully connected network and a second fully connected network, auditory and visual features of the input conversation, respectively, to acquire visually encoded data and auditorily encoded data;

calculating an embedding representation of the speaker; and acquiring the textual, visual, and auditory single-modal representations respectively based on the textually encoded data, the visually encoded data, the auditorily encoded data, and the embedding representation.

13. The system for multimodal ERC based on the GNN according to claim 12, wherein the encoding, by the GRU, a textual feature of the input conversation comprises utilizing:

$$c_i^t = \overleftrightarrow{GRU}(u_i^t, c_{i(+,-)1}^t)$$

the encoding, by the first fully connected network and the second fully connected network, auditory and visual features of the input conversation, respectively, comprises utilizing:

$$c_i^a = W_1 u_i^a + b_i^a$$

$$c_i^v = W_2 u_i^v + b_i^v$$

wherein $c_i^t$ denotes the textually encoded data; $c_i^a$ denotes the auditorily encoded data; $c_i^v$ denotes the visually encoded data; $\overleftrightarrow{GRU}()$ denotes a function of the bidirectional GRU; $u_i^t$ denotes the textual feature of an i-th utterance in the input conversation; $c_{i(+,-)1}^t$ indicates $c_{i+1}^t$ or $c_{i-1}^t$, denoting a preceding text or a subsequent text of a text input into the bidirectional GRU $\overleftrightarrow{GRU}()$; $W_1$ denotes the first fully connected network; $u_i^a$ denotes the auditory feature of the i-th utterance in the input conversation; $b_i^a$ denotes an auditory bias; $W_2$ denotes the second fully connected network; $u_i^v$ denotes the visual feature of the i-th utterance in the input conversation; and $b_i^v$ denotes a visual bias;

the calculating the embedding representation of the speaker comprises utilizing:

$$S_i = W_s s_i$$

wherein $S_i$ denotes an embedding feature of the speaker in an i-th round of conversation; $W_s$ denotes a trainable weight; and $s_i$ denotes a one-hot vector, referring to each speaker;

the acquiring the textual, visual, and auditory single-modal representations respectively comprises utilizing:

$$h_i^x = c_i^x + S_i, x \in \{t, a, v\}$$

wherein $h_i^x$ denotes a single-modal representation perceived by the speaker and the context of the i-th round of conversation; when x=t, $c_i^x$ denotes the textually encoded data; when x=a, $c_i^x$ denotes the auditorily encoded data; and when x=v, $c_i^x$ denotes the visually encoded data, and $S_i$ denotes the embedding representation of the speaker.

14. The system for multimodal ERC based on the GNN according to claim 11, wherein the performing the first node convolution on the hyper-graph, the updating hyper-edge embedding by aggregating a node feature, and the performing a hyper-edge convolution to propagate a hyper-edge message to the first node comprises utilizing:

$$V^{(l+1)} = \sigma\left(D_H^{-1} H W_e B^{-1} \hat{H}^T V^{(l)}\right)$$

wherein $V^{(l)}$ denotes an input into an l-th layer of a hyper-graph neural network, $$V^{(l)} = \{v_{i,(l)}^x \mid i \in [1, N], x \in \{t, a, v\}\} \in \mathbb{R}^{|V_H| \times D_h};$$

$v_{i,(l)}^x$ denotes a node in the l-th layer of the hyper-graph neural network; $v_H$ denotes a set of nodes in the hyper-graph; $D_h$ denotes a feature dimension of nodes in a hidden layer in the hyper-graph neural network; $\sigma()$ denotes a nonlinear activation function; $W_e$ denotes a hyper-edge weight matrix, $W_e = \text{diag}(w(e_1), \ldots, w(e_{|\varepsilon_H|}))$; $\text{diag}()$ denotes a diagonal matrix; $w()$ denotes the weight; $e_1$ denotes a first hyper-edge; $e_{|\varepsilon_H|}$ denotes the hyper-edge $|\varepsilon_H|$; $\varepsilon_H$ denotes a set of hyper-edges in the hyper-graph; $D_H \in \mathbb{R}^{|v_H| \times |v_H|}$ and $B \in \mathbb{R}^{|\varepsilon_H| \times |\varepsilon_H|}$ denote a node degree matrix and a hyper-edge degree matrix, respectively; H denotes a hyper-graph node and edge connection incidence matrix, $H \in \mathbb{R}^{|v_H| \times |\varepsilon_H|}$; $\hat{H}$ denotes a weighted incidence matrix, $$\hat{H} = \begin{cases} \gamma_e(v), & \text{if the hyper-edge } e \text{ is connected to the node } v; \\ 0, & \text{others} \end{cases}$$

and T denotes a transpose operation.

15. The system for multimodal ERC based on the GNN according to claim 11, wherein in the method for multimodal ERC based on the GNN, the extracting the different importance of different cross-modal and cross-context frequency components comprises:
- determining multiple second nodes based on the single-modal representation perceived by the speaker and the context;
- constructing an undirected graph based on all the second nodes;
- extracting, by a high-pass filter and a low-pass filter, a high-frequency message and a low-frequency message of a feature of a current node in the undirected graph, respectively;
- combining the high-frequency message and the low-frequency message through a weighted sum;
- considering a correlation between the current node and a neighboring node based on contributions of a high-frequency signal and the low-frequency message of the neighboring node to a weight of the current node, determining dominant information of the current node, and determining whether to receive differential information between the current node and the neighboring node;
- propagating the dominant information and the differential information to the entire undirected graph, and stacking K layers, such that each of the second nodes receives a multi-frequency signal from a K-hop neighboring node; and
- taking an output of a last layer as the multi-frequency representation data.

16. The system for multimodal ERC based on the GNN according to claim 15, wherein in the constructing an undirected graph, an adjacency matrix of the undirected graph is expressed as: $A \in \mathbb{R}^{|v_g| \times |v_g|}$;
- a normalized graph Laplacian matrix of the undirected graph is expressed as: $L = I - D_g^{-1/2} A D_g^{-1/2}$; $D_g$ denotes a diagonal degree matrix; I denotes an identity matrix; A denotes the adjacency matrix of the undirected graph; and $v_g$ denotes a node set in the graph;
- the combining the high-frequency message and the low-frequency message comprises utilizing:

$$F^{(k+1)} = R^l(F_l \cdot F^{(k)}) + R^h(F_h \cdot F^{(k)}) = F^{(k)} + (R^l - R^h) D_g^{-1/2} A D_g^{-1/2} F^{(k)}$$

wherein $F^{(k)}$ denotes an input into a k-th layer, $$F^{(k)} = \{f_{i,(k)}^x \mid i \in [1, N], x \in \{t, a, v\}\} \in \mathbb{R}^{|v_g| \times D_h};$$

$R^l, R^h \in \mathbb{R}^{|v_g| \times |v_g|}$ denotes weight matrices of the low-frequency message and the high-frequency message, respectively; and the above equation is rewritten as:

$$f_{i,(k+1)} = f_{i,(k)} + \sum_{j \in N_i} \frac{r_{ij}^l - r_{ij}^h}{\sqrt{|N_j|} \sqrt{|N_i|}} f_{i,(k)}$$

wherein $N_i$ denotes a neighboring node of a node i; $N_j$ denotes a neighboring node of a node j; and $r_{ij}^l$ and $r_{ij}^h$ denote contributions of a low-frequency message and a high-frequency message of the node j to the node i, respectively, where $r_{ij}^l + r_{ij}^h = 1$.

17. The system for multimodal ERC based on the GNN according to claim 11, wherein in the method for multimodal ERC based on the GNN, the fusing, by the GNN, the multivariate representation data and the multi-frequency representation data:

$$e_i = \overline{v_i^t} \oplus \overline{f_i^t} \oplus \overline{v_i^a} \oplus \overline{f_i^a} \oplus \overline{v_i^v} \oplus \overline{f_i^v}$$

the acquiring, by the GNN, the prediction label for each utterance in the input conversation comprises utilizing:

$$\hat{y}_i = \arg \max_\tau (P_i[\tau])$$

wherein, $\hat{y}_i$ denotes the prediction label of the input conversation; $P_i$=soft max $(W_4 \tilde{e}_i + b_4)$; $W_4$ denotes a trainable weight matrix; $\tilde{e}_i$ denotes a normalized emotional representation, $\tilde{e}_i = \text{ReLU}(e_i)$; $e_i$ denotes an emotional feature of the i-th utterance in the input conversation; $P_i[\tau]$ denotes a probability value of a τ-th category; τ denotes the τ-th category; $b_4$ denotes a bias of the trainable weight matrix; $v_i^x$, $i \in [1, N]$, $x \in \{t, a, v\}$ denotes the multivariate representation data; and $f_i^x$, $i \in [1, N]$, $x \in \{t, a, v\}$ denotes the multi-frequency representation data.

18. The system for multimodal ERC based on the GNN according to claim 11, wherein a loss function L of the multimodal ERC method based on the GNN is expressed as follows:

$$L = -\frac{1}{\sum_{s=1}^{Num} c(s)} \sum_{i=1}^{Num} \sum_{j=1}^{c(i)} \log p_{ij}[y_{i,j}] + \lambda \|\theta\|_2$$

wherein Num denotes a number of conversations; c(i) denotes a number of utterances in a conversation i; $p_{ij}$ and $y_{i,j}$ denote a probability distribution of a prediction label and a real label for an utterance j in the conversation i, respectively; λ denotes a weight of $L_2$ regularization; θ denotes all trainable model parameters; and c(s) denotes a number of utterances in a conversation s.

\* \* \* \* \*